Patented Mar. 9, 1926.

1,576,275

UNITED STATES PATENT OFFICE.

MINER L. HARTMANN, OF NIAGARA FALLS, NEW YORK, ASSIGNOR TO THE CARBORUNDUM COMPANY, OF NIAGARA FALLS, NEW YORK, A CORPORATION OF PENNSYLVANIA.

ZIRCONIUM CARBIDE.

No Drawing.   Application filed March 13, 1924.  Serial No. 699,143.

*To all whom it may concern:*

Be it known that I, MINER L. HARTMANN, a citizen of the United States, residing at Niagara Falls, county of Niagara, and State of New York, have invented a new and useful Improvement in Zirconium Carbide, of which the following is a full, clear, and exact description.

The present invention relates to zirconium carbide as an article of manufacture and to a process for the production of the same.

The common ores of zirconium consist of zirconium silicate, $ZrSiO_4$, and zirconium oxide, $ZrO_2$, and various natural mixtures of these two compounds. I will illustrate my method by describing its application to the production of fused zirconium carbide from the mineral zircon or zirconium silicate.

In carrying out my process, any form of arc furnace with vertical depending electrodes will be found suitable and is a preferred form of heating means. The electrodes may be of carbon or of graphite. The furnace pot may be lined with refractory material, preferably of zirconia or zirconium silicate, in order that the fused product may not be contaminated by materials other than zirconium compounds. The bottom of the furnace will preferably be made of carbon, upon which the fused carbide collects.

A charge consisting, for example of four parts by weight of commercial zirconium silicate (containing 96% $ZrSiO_4$) and one part of ground coke, may be used. The two ingredients are thoroughly mixed and then fed into and around the smothered arc of the furnace. By continuing this operation, a mass of fused zirconium carbide is produced, which after cooling, may be separated from the unfused portion, and utilized after crushing for abrasives or refractories as desired. Zirconium carbide is very hard being above 9 on Moh's hardness scale, and is characterized by grey metallic appearance.

The principal chemical reactions which prevail in my process are believed to be

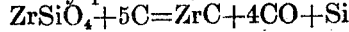

or

Practically, it is believed that both of these reactions take place, although in either case the element silicon is removed either as silicon vapor or as silica vapor. The zirconium carbide is stable and practically non-volatile at the operating temperature.

I have found that it is important to exclude air from the molten carbide since at high temperatures, especially at the melting point, it is easily oxidized to zirconium oxide. Especial care is therefore necessary to keep the arc covered with the charging mixture.

While I have illustrated my process of producing fused zirconium carbide from zirconium silicate as a raw material, I do not restrict myself to this particular material, since any ore of zirconium, such as the oxide, or mixtures of the silicate and oxide may be used after suitably altering the amount of carbon added to the mix before fusion. Other forms of electric furnaces which will give the requisite high temperature and reducing atmosphere may also be used.

I claim:

1. The process of making zirconium carbide consisting of fusing zirconium silicate ore under reducing conditions in an electric furnace and collecting the product.

2. The process of making zirconium carbide consisting of fusing in an electric furnace a mixture of zirconium silicate and carbon, and collecting the product.

3. The process of making zirconium carbide consisting of fusing in an electric furnace a mixture of zirconium silicate ore and carbon, and collecting the product.

4. A method of manufacturing zirconium carbide, which consists in heating a mass containing substantially four parts of zirconium silicate and one part of carbon to a fusing temperature under reducing conditions.

5. A method of manufacturing zirconium carbide, which consists in heating a mass containing zirconium silicate and carbon to effect a reaction thereof at a temperature at which there is substantially no volatilization of the resulting zirconium carbide and at a temperature sufficient to effect vaporization of silicon or silicon oxide.

In testimony whereof I have hereunto set my hand.

MINER L. HARTMANN.